US010533759B2

(12) United States Patent
Thomas

(10) Patent No.: US 10,533,759 B2
(45) Date of Patent: Jan. 14, 2020

(54) CLIMATE CONTROL DEVICE

(71) Applicant: Essick Air Products, Inc., Little Rock, AR (US)

(72) Inventor: Scott Thomas, Greenbrier, AR (US)

(73) Assignee: Essick Air Products, Inc., Little Rock, AR (US)

( * ) Notice: Subject to any disclaimer, the term of this patent is extended or adjusted under 35 U.S.C. 154(b) by 319 days.

(21) Appl. No.: 15/416,336

(22) Filed: Jan. 26, 2017

(65) Prior Publication Data

US 2017/0227243 A1 Aug. 10, 2017

Related U.S. Application Data

(60) Provisional application No. 62/288,119, filed on Jan. 28, 2016.

(51) Int. Cl.
*F24F 5/00* (2006.01)
*F24F 11/32* (2018.01)
(Continued)

(52) U.S. Cl.
CPC .............. *F24F 5/0035* (2013.01); *F24F 6/02* (2013.01); *F24F 11/001* (2013.01);
(Continued)

(58) Field of Classification Search
CPC ...... F24F 5/0035; F24F 2110/20; F24F 11/83; F24F 11/62; F24F 11/85; F24F 11/64
See application file for complete search history.

(56) References Cited

U.S. PATENT DOCUMENTS 3,193,261 A 7/1965 Nesbitt
3,253,820 A 5/1966 Seil
(Continued)

FOREIGN PATENT DOCUMENTS

CN 204026929 U * 12/2014
JP 62194147 A 8/1987

OTHER PUBLICATIONS

Irina, Remotely Controllable Intelligent Humidifier, Dec. 17, 2014, CN204026929U, Whole Document (Year: 2014).*
(Continued)

*Primary Examiner* — Larry L Furdge
(74) *Attorney, Agent, or Firm* — RatnerPrestia

(57) ABSTRACT

Climate control devices and methods are disclosed. One climate control device includes a housing, an evaporative medium port, a liquid level sensor, and a controller. The controller is configured to determine a change in the level of liquid in the housing, calculate an efficiency of an evaporative medium received by the evaporative medium port based on the change in the level of liquid, and provide an evaporative medium efficiency indication when the efficiency of the evaporative medium falls below a predetermined value. Another climate control device includes a housing, an evaporative medium port, a pump, a first conduit, and a controller. The controller configured to determine an evaporation rate of an evaporative medium received by the evaporative medium port, and operate the pump to pump liquid through the first conduit to the evaporative medium port at varying liquid flow rates dependent on the evaporation rate of the evaporative medium.

18 Claims, 6 Drawing Sheets

(51) Int. Cl.

| | | |
|---|---|---|
| *F24F 11/00* | (2018.01) | |
| *G01F 23/296* | (2006.01) | |
| *F24F 11/30* | (2018.01) | |
| *F24F 11/62* | (2018.01) | |
| *F24F 11/83* | (2018.01) | |
| *F24F 6/02* | (2006.01) | |
| *F24F 6/00* | (2006.01) | |
| *F24F 11/52* | (2018.01) | |
| *F24F 110/10* | (2018.01) | |
| *F24F 110/20* | (2018.01) | |
| *F24F 11/85* | (2018.01) | |
| *F24F 11/64* | (2018.01) | |
| *F24F 11/56* | (2018.01) | |

(52) U.S. Cl.
CPC .......... *F24F 11/0086* (2013.01); *F24F 11/30* (2018.01); *F24F 11/32* (2018.01); *F24F 11/62* (2018.01); *F24F 11/83* (2018.01); *G01F 23/2962* (2013.01); *F24F 11/52* (2018.01); *F24F 11/56* (2018.01); *F24F 11/64* (2018.01); *F24F 11/85* (2018.01); *F24F 2006/008* (2013.01); *F24F 2011/0052* (2013.01); *F24F 2011/0091* (2013.01); *F24F 2110/10* (2018.01); *F24F 2110/20* (2018.01)

(56) References Cited

U.S. PATENT DOCUMENTS

| | | | |
|---|---|---|---|
| 4,563,313 | A | 1/1986 | Tsuaki |
| 6,237,899 | B1 | 5/2001 | Offir et al. |
| 6,308,939 | B2 | 10/2001 | Offir et al. |
| 6,523,810 | B2 | 2/2003 | Offir et al. |
| 6,622,993 | B2 | 9/2003 | Mulvaney |
| 6,769,671 | B2 | 8/2004 | Rhea et al. |
| 6,789,585 | B1 | 9/2004 | Janke |
| 7,510,170 | B2 | 3/2009 | Huang |
| 7,661,448 | B2 | 2/2010 | Kim et al. |
| 7,730,830 | B2 | 6/2010 | Kaneko et al. |
| 8,296,993 | B2 | 10/2012 | Modlin et al. |
| 8,827,247 | B2 | 9/2014 | Kanel et al. |
| 2002/0189345 | A1* | 12/2002 | Mulvaney ............... G01F 23/22 73/295 |
| 2007/0278320 | A1* | 12/2007 | Lunacek ............ G05D 23/1902 236/94 |
| 2011/0061415 | A1* | 3/2011 | Ward ...................... F04B 49/04 62/291 |
| 2012/0064817 | A1* | 3/2012 | Choi ..................... F24F 5/0035 454/251 |
| 2013/0000337 | A1 | 1/2013 | Krause et al. |
| 2013/0138225 | A1* | 5/2013 | Gordon .............. G05B 19/0421 700/33 |
| 2015/0176880 | A1 | 6/2015 | Ochiai et al. |

OTHER PUBLICATIONS

AIR-O-SWISS Ultrasonic Humidifier 7142; http://www.iallergy.com/product_info.php?products_id=837, Jun. 2015, 3 pages.

Crane Drop Shape Ultrasonic Cool Mist humidifier with 2.3 Gallon output per day; http://www.amazon.com/Crane-Ultrasonic-Humidifier-Gallon-output/dp/b005pk7RW4, Jun. 2015, 7 pages.

Crane Digital Utrasonic Cool Mist/Warm Mist Humidifier Instruction Manual; http://www.crane-usa.com, Item #EE-8064, Model #SH8201, 12 pages.

Flowline Marine Life Science Tank Level Measurement; http://www.flowline.com/aaplication_success/marine-life-science-tank-level-measurement, Jun. 2015, 1 page.

Non-Final Office Action for U.S. Appl. No. 15/416,320, dated Sep. 14, 2017, 11 pages.

* cited by examiner

CLIMATE CONTROL DEVICE

CROSS-REFERENCE TO RELATED APPLICATIONS

The present application claims priority to U.S. Patent Application No. 62/288,119, entitled "CLIMATE CONTROL DEVICE WITH IMPROVED LIQUID LEVEL SENSING," filed Jan. 28, 2016, the contents of which are incorporated herein by reference in their entirety.

FIELD OF THE INVENTION

This invention relates generally to climate control devices, and more particularly to improving efficiency in climate control devices.

BACKGROUND OF THE INVENTION

Climate control devices, such as evaporative coolers and humidifiers, may be used to cool or humidify air by causing the air to flow through a dampened evaporative medium. The effectiveness of the climate control may depend in part on the ability of the device to manage the evaporation of liquid (e.g. water) into the air flowing through the device, and on the age of the evaporative medium. The user of the climate control device may be relied on to maintain an adequate supply of liquid, and to ensure that the evaporative medium is performing adequately. Accordingly, improvements in climate control devices are desired that improve the efficiency of the device and simplify the tasks for which the user is required.

SUMMARY OF THE INVENTION

Aspects of the present invention relate to climate control devices and methods.

In accordance with one aspect of the present invention, a climate control device is disclosed. The climate control device includes a housing, an evaporative medium port in the housing, a liquid level sensor, and a controller. The housing defines a receptacle for receiving liquid. The evaporative medium port is sized to receive an evaporative medium. The liquid level sensor is configured to sense a level of liquid in the receptacle. The controller is electrically coupled with the liquid level sensor. The controller is configured to determine a change in the level of liquid in the receptacle, calculate an efficiency of the evaporative medium received by the evaporative medium port based on the change in the level of liquid, and provide an evaporative medium efficiency indication when the efficiency of the evaporative medium falls below a predetermined value.

In accordance with another aspect of the present invention, a climate control method is disclosed. The climate control method includes determining a change in a level of liquid in a receptacle of a climate control device, calculating an efficiency of an evaporative medium of the climate control device based on the change in the level of liquid, and providing an evaporative medium efficiency indication when the efficiency of the evaporative medium falls below a predetermined value.

In accordance with yet another aspect of the present invention, another climate control device is disclosed. The climate control device includes a housing, an evaporative medium port in the housing, a pump, a first conduit, and a controller. The housing defines a receptacle for receiving liquid. The evaporative medium port is sized to receive an evaporative medium. The pump is positioned at least partially within the receptacle. The first conduit is connected between an outlet of the pump and the evaporative medium port. The controller is electrically coupled with the pump. The controller configured to determine an evaporation rate of the evaporative medium received by the evaporative medium port, and operate the pump to pump the liquid in the receptacle through the first conduit to the evaporative medium port at varying liquid flow rates dependent on the evaporation rate of the evaporative medium.

In accordance with still another aspect of the present invention, another climate control method is disclosed. The climate control method includes determining an evaporation rate of an evaporative medium in an evaporative medium port of a climate control device having a receptacle contained within the climate control device, and operating a pump to pump liquid in the receptacle of the climate control device to the evaporative medium at varying liquid flow rates dependent on the evaporation rate of the evaporative medium.

BRIEF DESCRIPTION OF THE DRAWINGS

The invention is best understood from the following detailed description when read in connection with the accompanying drawing. Included in the drawing are the following figures.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The invention is best understood from the following detailed description when read in connection with the accompanying drawing figures, which show exemplary embodiments of the invention selected for illustrative purposes. The invention will be described with reference to the figures. Such figures are intended to be illustrative rather than limiting and are included herewith to facilitate the explanation of the present invention.

Figure 1:
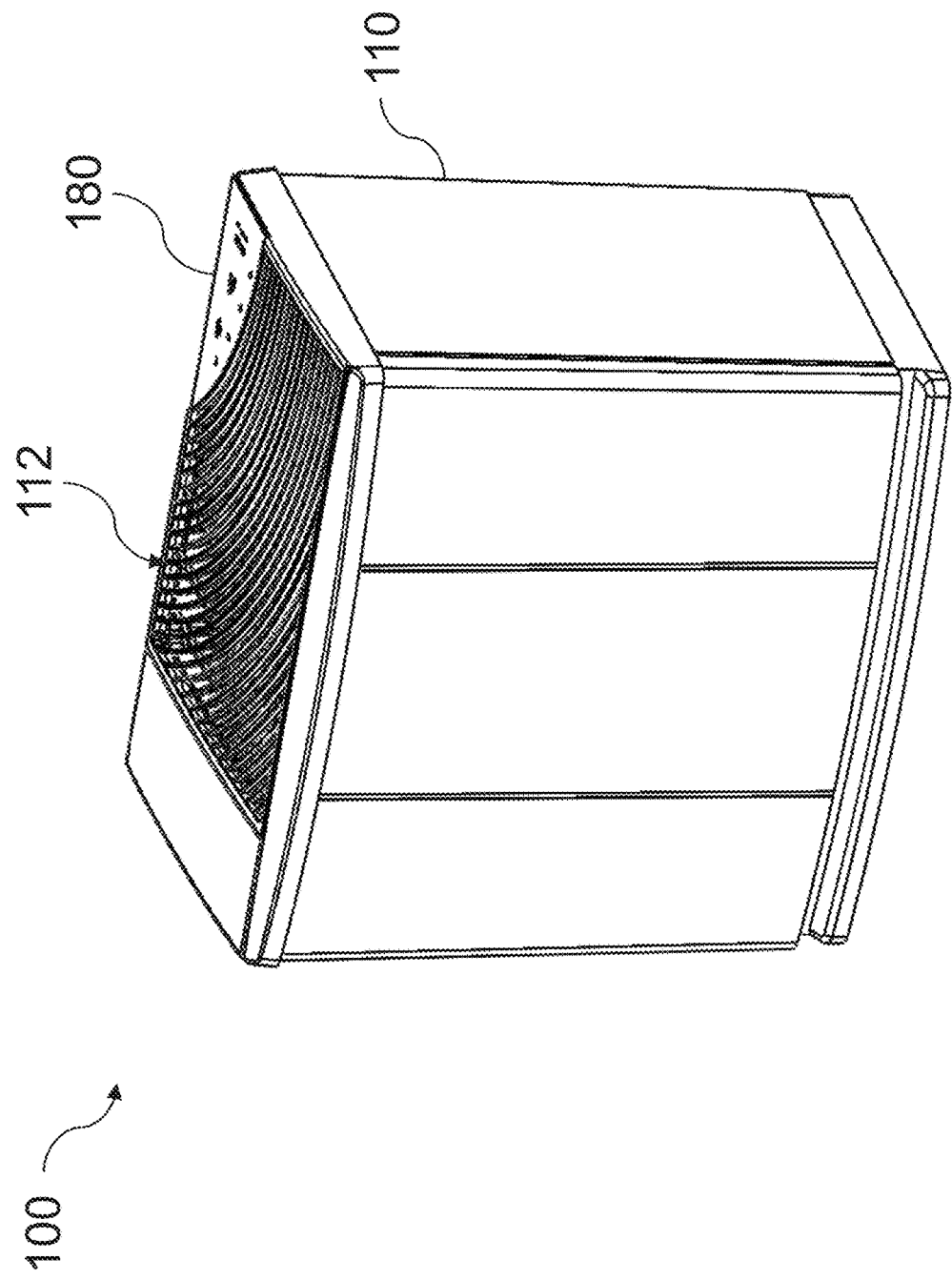
FIG. 1 is a diagram showing a perspective view of an exemplary climate control device in accordance with aspects of the present invention.
Figure 2:
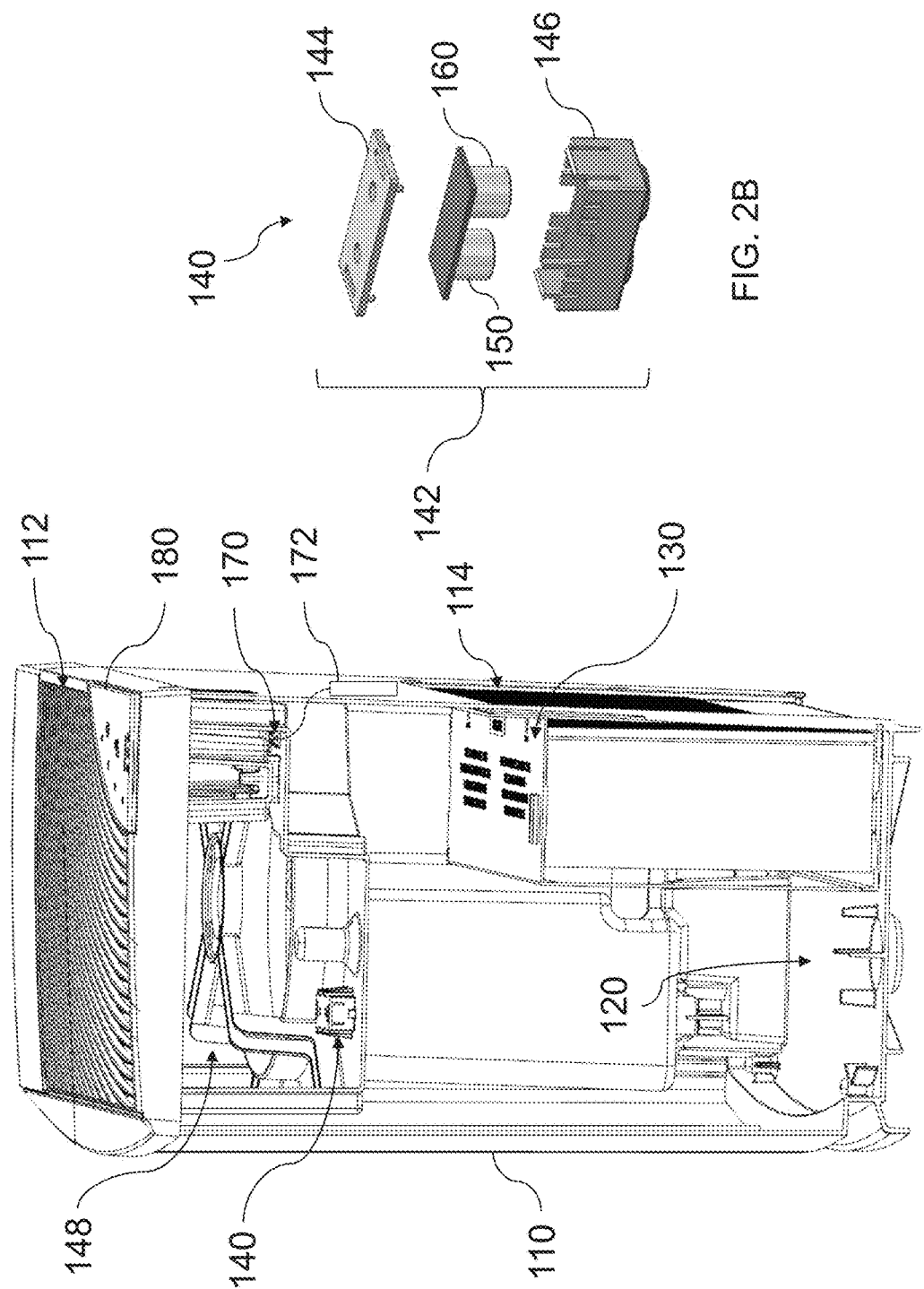
FIG. 2A is a diagram showing a cut-away view of the climate control device of FIG. 1.
FIG. 2B is a diagram showing an exploded view of an exemplary sensor of the climate control device of FIG. 1.

As an overview, FIGS. 1-2B show an exemplary embodiment of a climate control device 100 in accordance with an aspect of the present invention. Climate control device 100 may be, for example, an evaporative cooler or a humidifier.

Generally, climate control device 100 includes a housing 110, an evaporative medium port 130, a liquid level sensor 140, a controller 170, and a pump 190. Additional details of climate control device 100 will be provided herein.

Housing 110 defines an interior region of climate control device 100. Housing 110 defines an air inlet 112 for permitting air flow into the interior region of climate control device 100, and an air outlet 114 for permitting air flow out of the interior region of climate control device 100. During operation, climate control device 100 draws air in through air inlet 112, cools and/or humidifies the air within the interior region of housing 110 (depending on the desired operation of climate control device 100), and discharges air out through air outlet 114 into the environment being climate controlled.

Climate control device 100 may further include a fan for generating air flow through housing 110. The fan is connected to a motor which is configured to operate the fan at one or more speeds for generating a desired air flow. Suitable fans for use in climate control device 100 will be known to one of ordinary skill in the art from the description herein, and may be selected, for example, based on a desired air flow through climate control device 100 or on an intended size of housing 110.

Climate control device 100 utilizes liquid (e.g. water) during operation. Accordingly, housing 110 defines a receptacle 120 in the interior region of climate control device 100 for receiving the liquid. Receptacle 120 may be defined in part by the inside surface of outer walls of housing 110. Alternatively, housing 110 may include a separate structure defining receptacle 120 such as, for example, a basin (not shown) positioned in the interior region of housing 110. In an exemplary embodiment, receptacle 120 is formed in a bottom portion of housing 110, as illustrated in FIG. 2. In that exemplary embodiment, receptacle 120 may extend up to the bottom edge of air outlet 114, so that water does not leak out of air outlet 114.

Housing 110 may further include a filling access port for allowing a user to provide liquid to the interior region of housing 110 for filling receptacle 120. A user of climate control device 100 may pour liquid through the filling access port. Alternatively, a user may place one or more liquid containers within housing 110 by way of the filling access port. Once received in housing 110, the liquid containers may be configured (e.g., through an actuatable valve) to release their liquid into receptacle 120 in housing 110. Liquid received in receptacle 120 may be used to cool and/or humidify the air flowing through climate control device 100 by the process of evaporation. The evaporative cooling process of climate control device 100 will be described herein.

Housing 110 may be formed from a single integral piece of material, or from multiple pieces of material. Suitable materials for forming housing 110 include, for example, acrylonitrile butadiene styrene (ABS), high-impact polystyrene (HIPS), polypropylene, polystyrene, polycarbonate, and other suitable polymers or plastics. Other suitable materials for forming housing 110 will be known to one of ordinary skill in the art from the description herein. Housing 110 may be formed, for example, by injection molding.

Climate control device 100 includes an evaporative medium port 130 positioned within housing 110. Evaporative medium port 130 may be positioned adjacent air inlet 112 or outlet 114, so that air entering or leaving the interior region of climate control device 100 passes through evaporative medium received in port 130. Evaporative medium port 130 may be positioned covering air inlet 112 or air outlet 114 in order to help maximize the amount of liquid on evaporative medium 130 that evaporates into the air.

Evaporative medium port 130 is sized to receive an evaporative medium. When received in port 130, the evaporative medium contacts or receives the liquid in receptacle 120, and provides a plurality of connected surfaces from which the liquid may evaporate into the air flowing through climate control device 100.

In one exemplary embodiment, the evaporative medium operates by wicking to draw liquid from receptacle 120 into evaporative medium 130 for evaporation during operation of climate control device 100. In an alternative or additional exemplary embodiment, liquid in receptacle 120 may be pumped over or onto evaporative medium 130. An exemplary climate control device incorporating a pump 190 is described in greater detail below.

Levels of liquid received in receptacle 120 can change due to pumping and/or evaporation from the evaporative medium. Climate control device 100 includes a liquid level sensor 140 configured to sense the level of liquid in receptacle 120.

In an exemplary embodiment, liquid level sensor 140 is an ultrasonic liquid level sensor. As shown in FIG. 2B, sensor 140 includes an ultrasonic emitter 150 and an ultrasonic receiver 160. Ultrasonic emitter 150 is positioned to emit an ultrasonic wave toward a surface of the liquid received in receptacle 120. Ultrasonic receiver 160 is positioned to receive at least a portion of the ultrasonic wave after the ultrasonic wave reflects off of the surface of the liquid received in receptacle 120. Suitable devices containing an ultrasonic emitter and ultrasonic receiver usable in accordance with the present invention include, for example, the HC-SR04 ultrasonic distance sensor.

Figure 3:
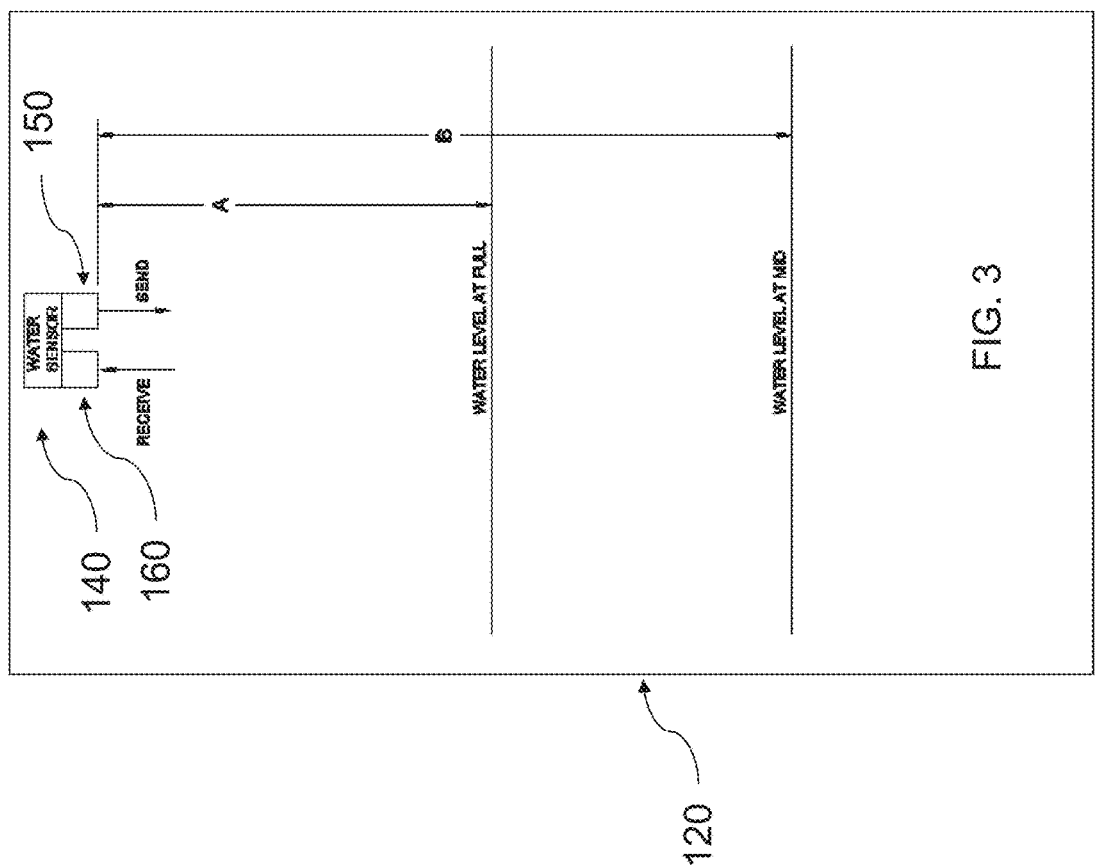
FIG. 3 is a diagram of an exemplary liquid level sensing operation of the sensor of FIG. 2B.

Ultrasonic emitter 150 may be positioned to emit the ultrasonic wave in a direction substantially orthogonal to the surface of the liquid received in receptacle 120. As shown in FIG. 3, ultrasonic sensor 140 may be positioned directly above receptacle 120, such that ultrasonic emitter 150 faces downward toward the surface of liquid received in receptacle 120. The ultrasonic wave then reflects off the surface of the liquid back toward ultrasonic sensor 140, where it is received by ultrasonic receiver 160.

As shown in FIGS. 2A and 2B, ultrasonic emitter 150 and ultrasonic receiver 160 can both be accommodated within a single sensor housing 142. Sensor housing 142 has an upper portion 144 and a lower portion 146. Lower portion 146 may include one or more ports to enable the emission and receipt of ultrasonic waves into and/or out of housing 142. In an exemplary embodiment, sensor housing 142 is positioned in a chamber 148 of housing 110 separate from receptacle 120. This separate chamber 148 may be desirable to minimize or eliminate the possibility of damage to ultrasonic sensor 140 by the liquid received in receptacle 120. Alternatively, sensor housing 142 may be positioned in the same section or chamber of housing 110 as receptacle 120.

Figure 4:
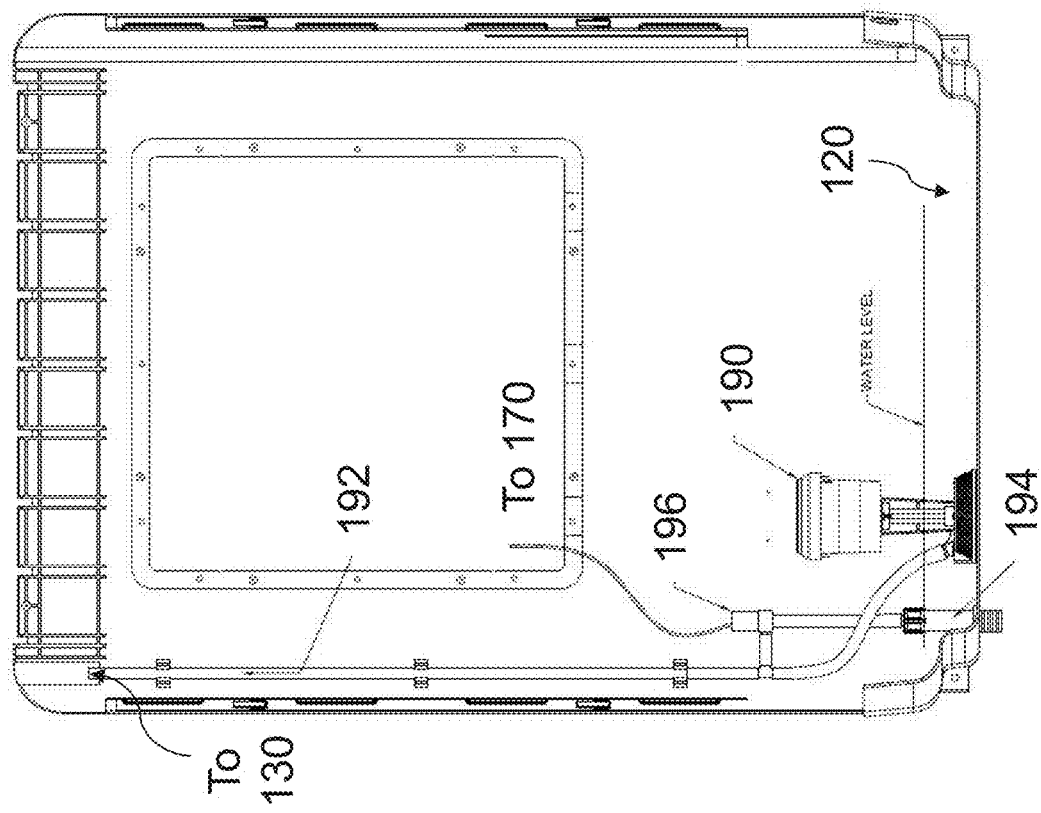
FIG. 4 is a diagram showing a pump layout of an exemplary climate control device in accordance with aspects of the present invention.

Pump 190 is positioned at least partially within receptacle 120. As shown in FIG. 4, pump 190 may be at least partially submerged when liquid (e.g., water) is received within receptacle 120. Pump 190 is configured to pump liquid out of receptacle 120 to evaporative medium 130. The pump is operable to take liquid in from receptacle 120 through an inlet and pump the liquid out of receptacle 120 through an outlet.

Pump 190 may be configured to be operated at one constant speed. However, in accordance with aspects of the present invention, pump 190 may be operable at varying speeds. The operating speed of pump 190 may be selected based on the mode of operation of climate control device 100, based on environmental conditions surround climate control device 100, and/or based on the evaporative medium within evaporative medium port 130, as will be discussed in greater detail below.

In an exemplary embodiment, a conduit 192 is connected between the outlet of pump 190 and evaporative medium port 130. Conduit 192 may be connected to a top of evaporative medium port 130. In a climate control mode, conduit 192 allows liquid exiting conduit 192 trickle down and cover evaporative medium received in port 130 under the force of gravity. In a further embodiment, a conduit 194 is connected between the outlet of pump 190 and an exterior of climate control device 100. Conduit 194 may share at least a portion with conduit 192. Conduit 194 may be usable to purge liquid from receptacle 120. In a purge mode, conduit 194 allows liquid to be pumped out of receptacle 120.

In order to switch between conduits 192 and 194, one or more valves 196 may be provided in conduit 192 and or conduit 194. Valve(s) 196 may be electrically actuatable valves, and may be controlled by controller 170, as set forth in greater detail below.

Controller 170 is electrically coupled with liquid level sensor 140 and pump 190. In one example, controller 170 provides a signal to ultrasonic emitter 150 to emit the ultrasonic wave toward the surface of the liquid. Likewise, controller 170 receives a signal from ultrasonic receiver 160 signaling receipt of the ultrasonic wave reflected off of the surface of the liquid. Controller 170 may be configured to provide an indication of the liquid level in receptacle 120 based on the ultrasonic wave received by ultrasonic receiver 160. In another example, controller 170 provides signals to pump 190 to operate pump 190 to pump liquid out of receptacle 120. Controller 170 may also change a speed of the motor of pump 190 in order to vary a flow rate of liquid pumped by pump 190. Particular operations of controller 170 are described in greater detail below.

Figure 5:
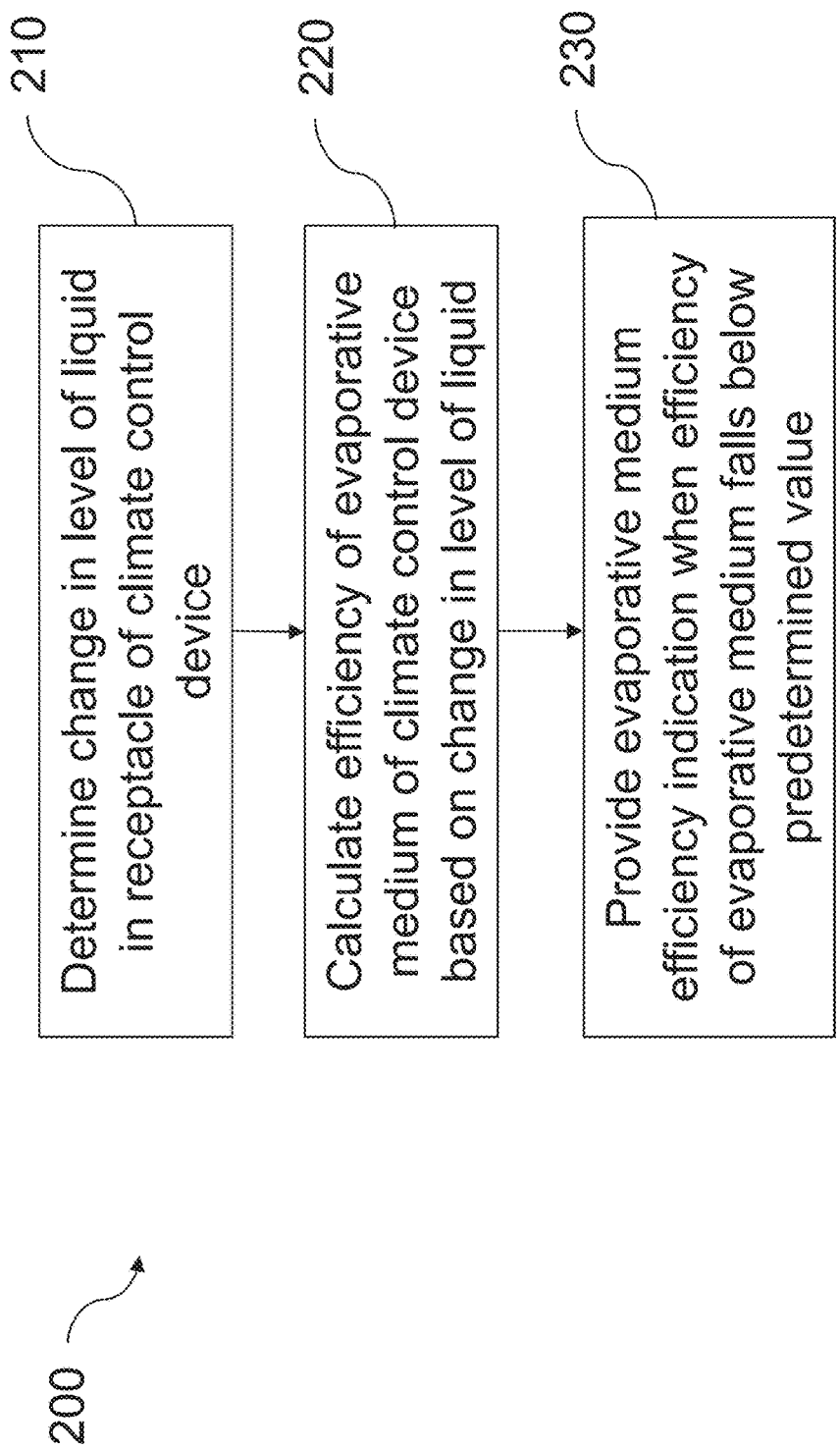
FIG. 5 is a flowchart showing an exemplary climate control method in accordance with aspects of the present invention.

Climate control device 100 may further include a display 180, as shown in FIG. 5. Display 180 is electrically coupled with controller 170. Controller 170 may provide a liquid level indication to a user of climate control device 100 using display 180. Display 180 may further include indications to the user of a current status of climate control device 100 (e.g., an on/off/standby status indicator), a current setting of climate control device (e.g., a current temperature or humidity or setpoint temperature or humidity), a current operating status (on or off) or speed of pump 190, and/or a current mode of climate control device 100 (e.g., a fan speed indicator, a silent mode indicator, a receptacle purge mode indicator). Still further, display 180 may provide an indication of the current efficiency of evaporative medium 130, as calculated by controller 170 and described in greater detail herein.

Climate control device 100 may further include a memory electrically coupled with controller 170 for storage of data relating to operation of climate control device 100. Climate control device 100 may be programmed to store data in the memory relating to the change in liquid level sensed using liquid level sensor 140 over a period of time, as will be discussed in greater detail below. Climate control device 100 may store in the memory predetermined relationships between operating speeds of pump 190 and evaporation rates of the evaporative medium, as will be discussed in greater detail below.

Climate control device 100 may further include a wireless transmitter electrically coupled with controller 170 for transmitting data relating to the operation of climate control device 100. Climate control device 100 may be programmed to transmit data with the wireless transmitter relating to the change in liquid level sensed using liquid level sensor 140 over a period of time, as will be discussed in greater detail below.

Operation of climate control device 100 will now be described. To begin a climate control operation, the fan of climate control device 100 is turned on, either by a user signal or automatically. The fan generates air flow into housing 110 via air inlet 112, through an evaporative medium in evaporative medium portion 130, and out through air outlet 114. At or before this point, liquid is added to receptacle 120 by the user. The presence of liquid in receptacle 120 may be determined using liquid level sensor 140. During this operation, liquid contained within receptacle 120 is provided to the evaporative medium, either through wicking from receptacle 120 or by being pumped out of receptacle 120. In an exemplary embodiment, pump 190 pumps liquid out of receptacle 120 through conduit 192 to the top of evaporative medium port 130, where the liquid trickles down over the evaporative medium. As air flows through the evaporative medium, the liquid on the evaporative medium evaporates, thereby humidifying and/or cooling the air. The speed of the fan may be adjusted (again, either by a user signal or automatically) to generate a desired flow of air and/or amount of cooling and/or humidifying.

During this operation, liquid level sensor 140 senses the level of liquid in receptacle 120 during operation of climate control device 100. Sensor 140 may sense the liquid level continuously or periodically, for example, once every 300 seconds (five minutes). An exemplary liquid level sensing operation is shown in FIG. 3. To sense the liquid level, an ultrasonic wave is emitted by ultrasonic emitter 150 toward the liquid in receptacle 120. The ultrasonic wave at least partially reflects off the surface of this liquid, and is subsequently received by ultrasonic receiver 160. Ultrasonic receiver 160 sends a signal to controller 170, which determines the length of time between emission and receipt of the ultrasonic wave. When receptacle 120 is full, the liquid level is a distance A (e.g., from 10.5 to 12.0 inches) from liquid level sensor 140, and a first length of time elapses between transmission and detection. When receptacle 120 is half full, the liquid level is a distance B (e.g., from 14.0 to 15.5 inches) from liquid level sensor 140, and a second, longer length of time elapses between transmission and detection. From the length of time that elapses between transmission and detection of the ultrasonic wave, controller 170 is operable to calculate the level of liquid in receptacle 120, using a fixed relationship based on the speed of the ultrasonic wave. In an exemplary liquid level sensor 140, the amount of time elapsed may be approximately 29.4 μs per centimeter traveled.

Controller 170 determines a change in liquid level over a period of operation of climate control device 100. Controller 170 is configured to monitor the change in liquid level by storing the elapsed time for each liquid level measurement in its associated memory, and calculating how this elapsed time changes with each measurement. A series of measurements with increasing elapsed times indicate that the liquid level is lowering in receptacle 120, e.g., due to evaporation of the liquid from the evaporative medium. A measurement with a relative long elapsed time indicates that receptacle 120 is close to being empty. When controller 170 determines that the level of liquid in receptacle 120 falls below a predetermined level, controller 170 may be configured to stop operation of pump 190. Automatic deactivation of pump 190 using controller 170 may be desirable in order to avoid potential damage to or unnecessary operation of pump 190 caused, for example, by operation in an empty receptacle 120. A measurement with a significantly lower elapsed time than previous measurements indicates that receptacle 120 has been refilled with liquid, at which point controller 170 may be configured to resume operation of pump 190.

From the determination of changes in liquid level, controller 170 may further be configured to calculate an efficiency of the evaporative medium. An exemplary method for calculating efficiency is provided below. Prior to calculating efficiency, controller 170 establishes a baseline value for changes in the level of liquid in receptacle 120. The baseline value may represent the expected change in liquid level when the evaporative medium is operating at a desired or acceptable efficiency. The baseline value may be established by controller 170 when receptacle 120 is half full, in order to avoid possible effects on baseline calculations for high or low liquid levels. In one example, when receptacle 120 reaches a half full level, controller 170 begins recording a liquid level measurement every 300 seconds (five minutes) for a duration of 1800 seconds (one half hour), resulting in seven discrete liquid level measurements. The difference between the last and first measurements in this duration may be used as a baseline value indicating total water used by climate control device 100 over a half hour period of normal operation. Such a baseline value may be, for example, from 3.0 cm/hour to 5.0 cm/hour. Controller 170 may be configured to store the baseline value for an evaporative medium in the associated memory.

Controller 170 may be configured to calculate or recalculate the baseline value whenever a new evaporative medium is received in evaporative medium port 130. Controller 170 may identify that a new evaporative medium has been received in evaporative medium port 130, and then establish a new baseline value for changes in liquid level for the newly received evaporative medium. Controller 170 may be configured to identify that a new evaporative medium has been installed based on changes in liquid level. For example, if controller 170 determines a change in liquid level that is greater than previous measurements by a predetermined amount (e.g., a 10% increase in the change in liquid level from immediately preceding measurements), controller 170 may determine that a new evaporative medium has been received in evaporative medium port 130.

Controller 170 may be configured to calculate or recalculate the baseline value whenever the speed setting of the fan in climate control device 100 changes, as such a speed setting may affect the rate of evaporation of liquid from the evaporative medium. The baseline for each speed setting of climate control device 100 may be established in the same manner set forth above.

If the above conditions for establishing a baseline are not satisfied after a predetermined period of time (e.g., fourteen days), a predetermined baseline value may be used to calculate efficiency. For example, if the liquid level in receptacle 120 never reaches the half full level due to constant refilling or limited use, controller 170 may utilize a baseline value stored on the associated memory for calculating efficiency.

After the baseline value for changes in liquid level is established, later changes in liquid level determined by controller 170 may be compared to the baseline value. The efficiency of the current evaporative medium may be calculated based on the difference between current changes in liquid level and the baseline changes in liquid level. For one example, controller 170 may divide the newest change in liquid level by the baseline value to calculate a percentage of a presently determined change in liquid level relative to the baseline change. In an example where controller 170 has previously established a baseline value of 4 cm/hour, and determines that the most recent change in liquid level is 2.5 cm/hour, controller 170 may then calculate that the evaporative medium is operating at 2.5/4.0=62.5% efficiency. Controller 170 may then be configured to store the efficiency for the evaporative medium in the associated memory. A history of efficiency measurements may be stored, or only the most recent efficient memory may be stored.

In addition to calculating the efficiency of the evaporative medium, controller 170 may be configured to vary the operating speed of pump 190. In an exemplary embodiment, controller 170 is configured to determine an evaporation rate of the evaporative medium, and operate pump 190 to pump the liquid in receptacle 120 through conduit 192 to evaporative medium port 130 at varying liquid flow rates dependent on the evaporation rate of the evaporative medium.

As used herein, the term "evaporation rate" is not intended to refer solely to the rate at which water evaporates from an evaporative medium (the "actual" evaporation rate), but is also intended to encompass factors that affect the actual evaporation rate. It will be understood by one of ordinary skill in the art that the actual evaporation rate of the evaporative medium may be dependent on a number of factors, any of which can be utilized by controller 170 as an evaporation rate to vary the liquid flow rate generated by pump 190. For one example, climate control device 100 may include a temperature and/or a relative humidity sensor 172 in communication with controller 170. A temperature sensor 172 would be configured to sense a temperature in an environment surrounding the climate control device, which will affect the evaporation rate of the evaporative medium. Controller 170 will then vary the liquid flow rate of pump 190 based on the sensed temperature. A humidity sensor 172 would be configured to sense a relative humidity in an environment surrounding the climate control device, which will affect the evaporation rate of the evaporative medium. Controller 170 will then vary the liquid flow rate of pump 190 based on the sensed relative humidity. For another example, controller 170 may calculate the efficiency of the evaporative medium in the manner set forth above. Controller 170 will then vary the liquid flow rate of pump 190 based on the calculated efficiency. Suitable temperature and humidity sensors for use in climate control device 100 will be known to one of ordinary skill in the art from the description herein.

It will be understood from the description herein that controller 170 may rely on any one or more of the above factors as representative of the evaporation rate of the evaporative medium. Controller 170 may further utilize the memory to store relationships between sensed temperature, sensed humidity, and/or efficiency and pump speed. Controller 170 may utilize a look-up table to select an operating speed for pump 190 based on any one or more of the sensed temperature, sensed humidity, and/or efficiency. For example, when the evaporation rate of the evaporative medium is low, controller 170 may operate pump 190 to pump a relatively low amount of water to the evaporative medium, to avoid overwetting or water entrainment in the air flow through the evaporative medium. For another example, when the evaporation rate of the evaporative medium is high, controller 170 may operate pump 190 to pump a relatively high amount of water to the evaporative medium, to avoid drying out of the evaporative medium or underperformance of climate control device 100.

As set forth above, pump 190 may be connected to multiple conduits 192 and 194. In this embodiment, controller 170 may further be configured to switch pump 190 between different modes of operation to utilize each conduit. In a climate control operation, controller 190 may be configured to operate pump 190 to pump liquid through conduit 192 to enable evaporation of liquid from the evaporative medium in evaporative medium port 130. In a purge operation, controller 190 may be configured to operate pump 190 to pump liquid through conduit 194 to drain liquid from receptacle 120. In a further embodiment, controller 170 may be configured to switch between these modes by actuating valve(s) 196. In the climate control operation, controller 170 is configured to toggle valve 196 to open conduit 192, and thereby prevent liquid from travelling through conduit 194. Conversely, in a purge operation, controller 170 is configured toggle valve 196 to open conduit 194, and thereby prevent liquid from travelling through conduit 192.

Controller 170 can further provide an indication of evaporative medium efficiency to the user of climate control device 100. Controller 170 may provide this indication continuously, and/or only when the efficiency of the evaporative medium falls below a predetermined value, for example, 60.0%. The indication may be a visual indication, an audible indication, and/or may be a wireless device message, such as a Short Message Service (SMS) or electronic mail indication.

In one exemplary embodiment, the evaporative medium efficiency indication may be provided on display 180, as set forth above. In another exemplary embodiment, controller 170 is configured to transmit the evaporative medium efficiency indication to a wireless device of a user, using a wireless transmitter electrically coupled with controller 170. The wireless transceiver may be operable to send information wirelessly to the user via the internet, near field communication (NFC), Bluetooth, or other conventional wireless communications protocols. When the efficiency is below a predetermined value, controller 170 may further be configured to transmit an evaporative medium replacement offer to the wireless device of the user. The offer may further include, for example, an internet link to a webpage at which the user can purchase a replacement evaporative medium for climate control device 100.

Controller 170 is not limited to transmitting efficiency information to a user's wireless device, but may also transmit additional information relating to operation of climate control device 100. For example, controller 170 may transmit information to the user regarding a current operating mode of climate control device 100, or a current fan speed for the fan of climate control device 100. Controller 170 may also transmit information to the user regarding any data sensed by sensors of climate control device 100, including liquid level in receptacle 120, and/or current temperature or humidity. When liquid level falls below a predetermined value (e.g., 20% of full), controller 170 may further be configured to transmit a low liquid level indication to the wireless device of the user. When humidity falls below a predetermined value (e.g., 35%), controller 170 may further be configured to transmit a low humidity indication to the wireless device of the user. Other items of information to be transmitted by controller 170 will be understood from the description herein.

Controller 170 may further be configured to receive information or inputs from the user's wireless device via the wireless transceiver. For example, controller 170 may be configured to receive an on/off signal to climate control device 100. For another example, controller 170 may be configured to receive signals adjusting a fan speed or humidity set point for operation of climate control device 100. Other types of input to be received by controller 170 via the wireless transceiver will be understood from the description herein.

FIG. 5 shows an exemplary embodiment of a climate control method 200 in accordance with an aspect of the present invention. Climate control method 200 may be performed, for example, by an evaporative cooler or a humidifier. Generally, climate control method 200 includes determining a change in liquid level, calculating an efficiency, and providing an efficiency indication. Additional details of climate control method 200 will be described herein with reference to the components of climate control device 100.

In step 210, a change in a level of liquid in a receptacle of a climate control device is determined. In an exemplary embodiment, controller 170 determines a change in the level of liquid in receptacle 120, for example, due to evaporation of the liquid from the evaporative medium. The change may be determined by emitting an ultrasonic wave toward a surface of the liquid in receptacle 120 using ultrasonic emitter 150, and receiving at least a portion of the ultrasonic wave after the ultrasonic wave reflects off the surface of the liquid in receptacle 120 using ultrasonic receiver 160.

In step 220, an efficiency of the evaporative medium is calculated based on the change in the liquid level. In an exemplary embodiment, controller 170 calculates the efficiency of the evaporative medium based on the changes in liquid level sensed using liquid level sensor 140. Controller 170 may calculate this efficiency by establishing a baseline value for changes in the level of liquid in receptacle 120, and comparing the change in level of liquid to the baseline value. Controller 170 may establish this baseline value whenever controller 170 identifies that a new evaporative medium has been received in evaporative medium port 130 of climate control device 100. Controller 170 may further store the established baseline in an associated memory.

Figure 6:
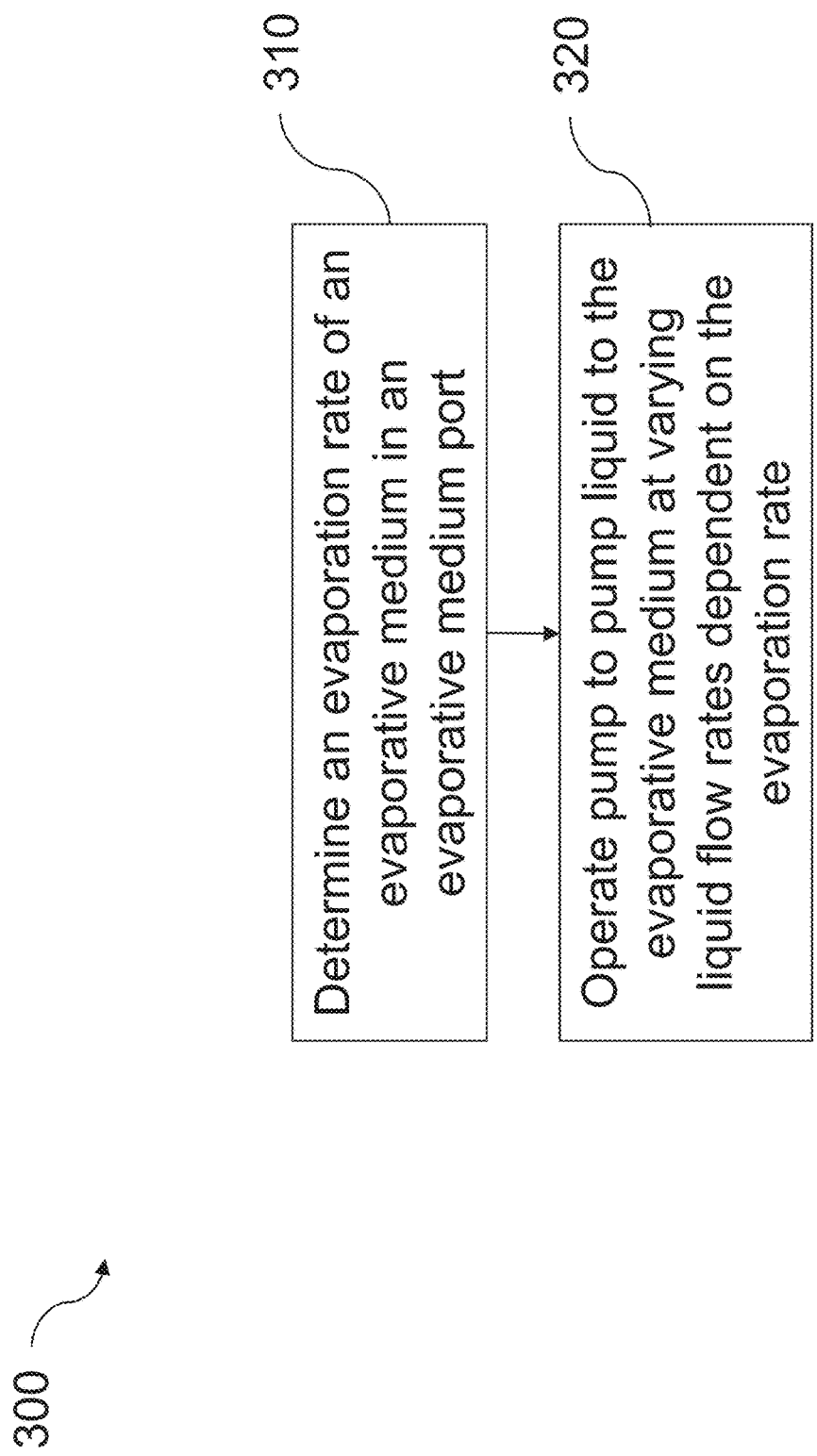
FIG. 6 is a flowchart showing another exemplary climate control method in accordance with aspects of the present invention

In step 230, an evaporative medium efficiency indication is provided. In an exemplary embodiment, controller 170 provides an evaporative medium efficiency indication when the efficiency of the evaporative medium falls below a predetermined value, for example, 60.0%. Controller 170 may transmit the evaporative medium efficiency indication to a wireless device of a user. Controller 170 may further transmit an evaporative medium replacement offer to the wireless device of the user, as well as a liquid level indication to the wireless device of the user FIG. 6 shows an exemplary embodiment of a climate control method 300 in accordance with an aspect of the present invention. Like method 200, climate control method 300 may be performed, for example, by an evaporative cooler or a humidifier. Generally, climate control method 300 includes determining an evaporation rate, and operating a pump. Additional details of climate control method 300 will be described herein with reference to the components of climate control device 100.

In step 310, an evaporation rate of an evaporative medium in an evaporative medium port of a climate control device is determined. In an exemplary embodiment, controller 170 determines an evaporation rate of the evaporative medium in port 130. Where climate control device 100 includes a temperature sensor, this step may include sensing a temperature in an environment surrounding the climate control device. Where climate control device 100 includes a relative humidity sensor, this step may include sensing a relative humidity in an environment surrounding the climate control device. This step may also include calculating an efficiency of the evaporative medium, as described above with respect to method 200.

In step 320, a pump is operated to pump liquid to the evaporative medium. In an exemplary embodiment, controller 170 operates pump 190 to pump liquid in receptacle 120 to the evaporative medium at varying flow rates dependent on the evaporation rate of the evaporative medium. For example, when the evaporation rate of the evaporative medium is low, controller 170 may operate pump 190 to pump a relatively low amount of water to the evaporative medium, to avoid overwetting or water entrainment in the air flow through the evaporative medium. For another example, when the evaporation rate of the evaporative medium is high, controller 170 may operate pump 190 to pump a relatively high amount of water to the evaporative medium, to avoid drying out of the evaporative medium or underperformance of climate control device 100.

Method 300 is not limited to the above steps, but may include alternative or additional steps as would be understood from the description herein.

Climate control device 100 may include a liquid level sensor 140. In this embodiment, method 300 may include the steps of sensing a level of liquid in receptacle 120 with liquid level sensor 140, and stopping operation of pump 190 when the level of liquid in the receptacle falls below a predetermined level Climate control device 100 may also include a conduit 194 for performing a purge operation. In this embodiment, method 300 may include the step of operating pump 190 to pump liquid in receptacle 120 outside of climate control device 100, through conduit 194 to beyond an exterior surface of climate control device 100.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A climate control device comprising:
   a housing defining a receptacle for receiving liquid;
   an evaporative medium port sized to receive an evaporative medium;
   a liquid level sensor configured to sense a level of liquid in the receptacle; and
   a controller electrically coupled with the liquid level sensor, the controller configured to:
   determine a change in the level of liquid in the receptacle over a period of time;
   calculate an efficiency of the evaporative medium received by the evaporative medium port based on a value of the change in the level of liquid over the period of time; and
   provide an evaporative medium efficiency indication when the efficiency of the evaporative medium falls below a predetermined value.

2. The climate control device of claim 1, wherein the liquid level sensor comprises:
   an ultrasonic emitter positioned to emit an ultrasonic wave toward a surface of the liquid received in the receptacle; and
   an ultrasonic receiver positioned to receive at least a portion of the ultrasonic wave after the ultrasonic wave reflects off of the surface of the liquid.

3. The climate control device of claim 1, wherein the controller is further configured to:
   establishing a baseline value for changes in the level of liquid in the receptacle; and
   comparing the value of the change in the level of liquid over the period of time to the baseline value.

4. The climate control device of claim 3, wherein the controller is further configured to:
   identify that a new evaporative medium has been received in the evaporative medium port; and
   establish a new baseline value when the new evaporative medium is received in the evaporative medium port.

5. The climate control device of claim 3, further comprising a memory electrically coupled with the controller, wherein the controller is configured to store the baseline value in the memory.

6. The climate control device of claim 1, further comprising a wireless transmitter electrically coupled with the controller, wherein the controller is configured to transmit the evaporative medium efficiency indication with the wireless transmitter.

7. The climate control device of claim 6, wherein the controller is further configured to transmit an evaporative medium replacement offer with the wireless transmitter.

8. The climate control device of claim 6, wherein the controller is further configured to transmit a liquid level indication with the wireless transmitter.

9. The climate control device of claim 1, wherein the climate control device is an evaporative cooler.

10. The climate control device of claim 1, wherein the climate control device is a humidifier.

11. A climate control method comprising:
    determining a change in a level of liquid in a receptacle of a climate control device over a period of time;
    calculating an efficiency of an evaporative medium of the climate control device based on a value of the change in the level of liquid over the period of time; and
    providing an evaporative medium efficiency indication when the efficiency of the evaporative medium falls below a predetermined value.

12. The climate control method of claim 11, wherein the determining comprises:
    emitting an ultrasonic wave toward a surface of the liquid in the receptacle;
    receiving at least a portion of the ultrasonic wave after the ultrasonic wave reflects off of the surface of the liquid.

13. The climate control method of claim 11, wherein the calculating comprises:
    establishing a baseline value for changes in the level of liquid in the receptacle; and
    comparing the value of the change in the level of liquid over the period of time to the baseline value.

14. The climate control method of claim 13, further comprising:
    identifying that a new evaporative medium has been received by the climate control device; and
    establishing the baseline value when the new evaporative medium is received.

15. The climate control method of claim 13, further comprising storing the baseline value in a memory of the climate control device.

16. The climate control method of claim 11, wherein the providing comprises:
    transmitting the evaporative medium efficiency indication.

17. The climate control method of claim 16, wherein the providing further comprises:

transmitting an evaporative medium replacement offer.

18. The climate control method of claim 16, wherein the providing further comprises:

transmitting a liquid level indication.

\* \* \* \* \*